US005623992A

United States Patent [19]
Shaw

[11] Patent Number: 5,623,992
[45] Date of Patent: Apr. 29, 1997

[54] METHOD AND SYSTEM FOR DECONTAMINATING SOILS AND GROUNDWATER OF GASOLINE

[76] Inventor: Neil B. Shaw, 11305 SE. Nancy Rd., Vancouver, Wash. 98664

[21] Appl. No.: 523,101

[22] Filed: Sep. 1, 1995

[51] Int. Cl.$^6$ .................. B09C 1/08; E21B 47/00
[52] U.S. Cl. .............. 166/250.01; 166/370; 210/747; 405/128
[58] Field of Search .............. 405/128; 166/250.01, 166/306, 370, 371; 210/620, 631, 947; 588/205

[56] References Cited

U.S. PATENT DOCUMENTS

| | | | |
|---|---|---|---|
| 3,846,290 | 11/1974 | Raymond | 210/620 X |
| 5,037,240 | 8/1991 | Sherman | 405/128 |
| 5,221,159 | 6/1993 | Billings et al. | 405/128 |
| 5,246,309 | 9/1993 | Hobby | 405/128 |
| 5,387,057 | 2/1995 | DeLoach | 405/128 |
| 5,398,757 | 3/1995 | Corte et al. | 166/370 X |

*Primary Examiner*—George A. Suchfield
*Attorney, Agent, or Firm*—Olson & Olson

[57] ABSTRACT

Biodegradation of gasoline by microorganisms in soil and groundwater is achieved by improving the growing conditions for petroleum degrading microorganisms in the subsurface by introducing oxygen containing gas and soluble nitrogen into a system of closely spaced aeration columns extending vertically in the soil to below the groundwater surface. As the gas rises through the groundwater in the columns it oxygenates surrounding soil and groundwater and raises the water level in the columns above the groundwater table. This water level differential induces groundwater migration in the columns and in soil surrounding the columns, providing limited vertical circulation of groundwater in the soil.

20 Claims, 2 Drawing Sheets

METHOD AND SYSTEM FOR DECONTAMINATING SOILS AND GROUNDWATER OF GASOLINE

BACKGROUND OF THE INVENTION

This invention relates to the decontamination of soils and groundwater of gasoline, caused primarily by leakage from service station storage tanks.

Efforts to reclaim areas of soil and groundwater contaminated with gasoline heretofore have involved a variety of activities following removal of gasoline storage tanks. One effort has involved the costly physical removal of the contaminated soil to substantial depths and either purifying the soil or replacing it with uncontaminated soil, sand, or gravel. Another effort involves the in situ high pressure air injection into sealed wells for lateral migration through the gasoline-containing subsurface, and the extraction of hydrocarbon vapors entrained in the resulting air stream from vacuum recovery. The effectiveness of this system is quite limited, especially in low permeability soils, primarily because of the difficulty in evenly dispersing the injected air laterally through non-homogeneous subsurface environments.

SUMMARY OF THE INVENTION

In its basic concept, the method and system of this invention involves bioremediation of gasoline contaminated soil and groundwater through the use of low pressure injection of air or other oxygen containing gas into groundwater contaminated with gasoline, through a multiplicity of closely spaced, small diameter aeration columns which extend below the water table, for a time sufficient to reduce the concentration of gasoline contaminants to the level of drinking water standards as identified, for example, as 5 ppb benzene.

It is the principal objective of this invention to provide a method and system for decontaminating soils and groundwater of gasoline, that avoids the aforementioned disadvantages and limitations of prior methods and systems.

Another objective of this invention is to provide a method and system of the class described that is implemented with speed, facility and economy to effect substantially complete removal of gasoline from soils and ground water.

A further objective of this invention is to provide a method and system of the class described that is enhanced by the introduction into the aeration columns of liquid fertilizers and other sources of dissolved nitrogen.

The foregoing and other objects and advantages of this invention will appear from the following detailed description, taken in connection with the accompanying drawings of a preferred embodiment.

DESCRIPTION OF THE PREFERRED EMBODIMENT

Figure 1:
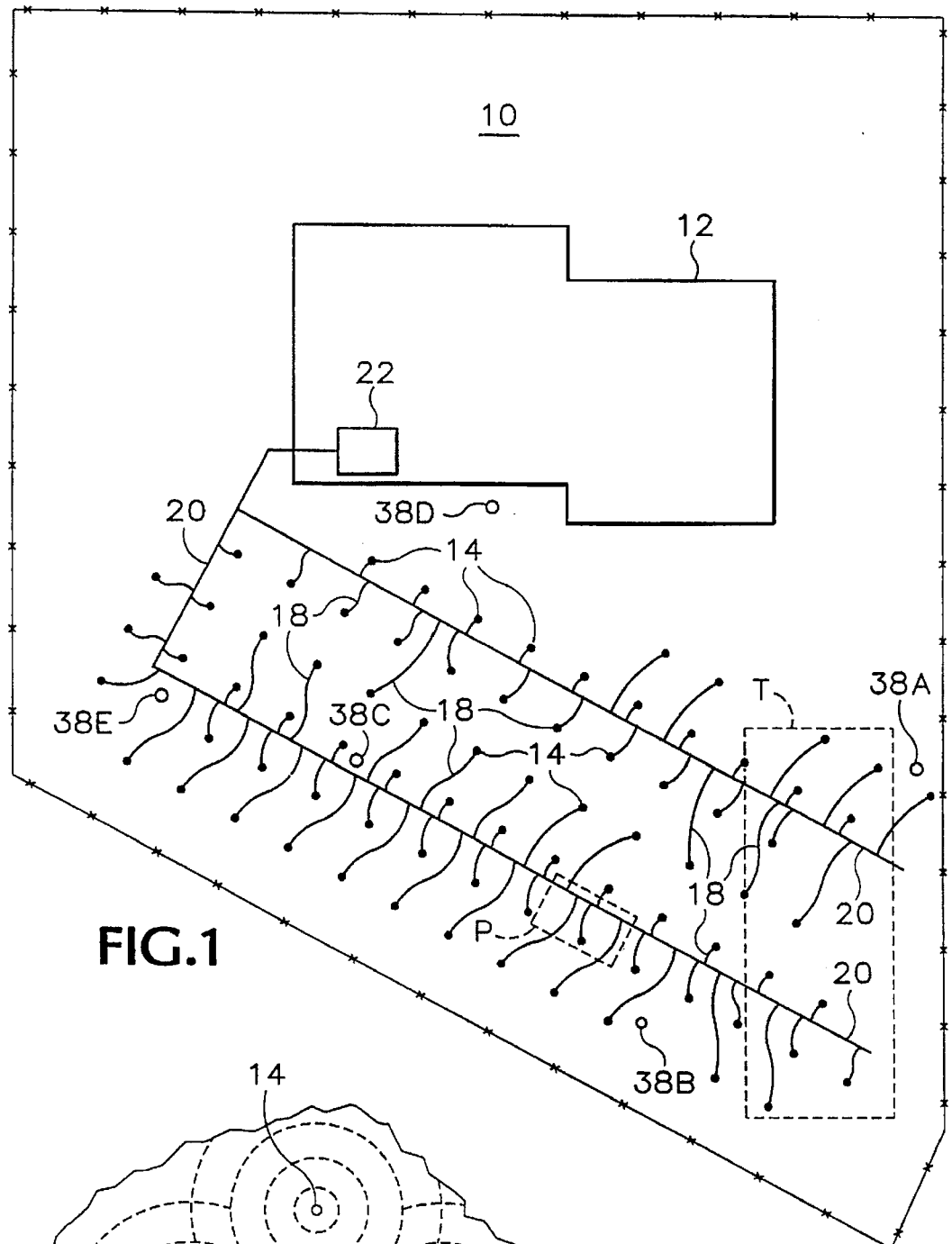
FIG. 1 is a plan view of an area provided with a gasoline decontaminating system embodying the features of this invention.

FIG. 1 illustrates a typical gasoline remediation site 10, from which a plurality of gasoline storage tanks have been removed after termination of operation of a service station. The service station building 12 may be used for equipment storage and other purposes.

Figure 2:
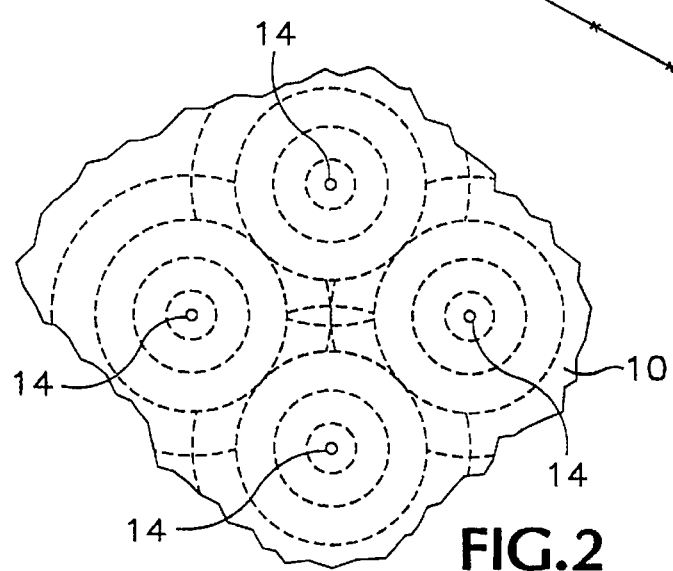
FIG. 2 is a fragmentary plan view of a portion of the area of FIG. 1 illustrating in broken lines the diffusion of groundwater outward from aeration columns and downward to the groundwater table, to substantially completely treat the entire subsurface between columns.

In accordance with this invention, a multiplicity of small diameter borings 14, for example about 1" (2.54 cm) in diameter, are drilled into the site vertically to depths which extend below the groundwater level 16 (FIG. 2). The borings, hereinafter referred to as aeration columns, are spaced closely together, for example about 5 ft. (1.5 mm) to ensure thorough treatment of contaminated areas.

In the embodiment illustrated, a small diameter tubing 18 of polyethylene or other suitable material is extended to the bottom of each aeration column, and all of the tubings are connected through a manifold 20 and pipe 20' to a compressor 22 capable of providing low pressure air to the system of tubings. The magnitude of air pressure required for the present invention is the pressure necessary to overcome the hydrostatic pressure of groundwater in the aeration columns so that air may be injected into the water at the bottom of the tubings 18. The air pressure required to overcome the hydrostatic pressure of groundwater is 0.43 psi for each foot of depth of the tube 18 below the level of groundwater in the column. For example, air pressure of about 5 psi is adequate for supplying air to tubings which extend about 10 ft. (3.2 meters) below the groundwater surface. Proportionately greater air pressure is needed for supplying air to tubings which extend to greater depths.

The aeration columns 14 preferably are filled with sand, glass fiber batting, cloth, or other porous material 24 to ensure against their collapse and to create maximum surface area to enhance oxygenation of the subsurface. However, the columns may be left unfilled, if desired, if the surrounding soil does not induce collapse of the columns. Alternatively, the columns may be reinforced with perforated pipe, and the pipe may be filled with porous material if desired.

An air vent tubing 26 is extended downward into each column to a depth above the water level 28 in the columns. An upper portion of the columns, above the bottom end of the air vent 26 also preferably is closed by a packing 30 of bentonite or other suitable sealing material.

The air vent tubings 26 are coupled to a manifold 32 which, in turn, communicate through pipe 32' with the inlet of a vacuum pump 34. The outlet 36 of the pump exhausts to the atmosphere. This outlet may serve to collect air and entrained volatiles vented from the aeration columns 14 for chemical analysis.

The site 10 also is provided with a plurality of monitoring wells located strategically throughout the site for collecting groundwater samples for chemical analysis. Each monitoring well extends to a depth below groundwater level 16 and is sufficiently large in diameter to facilitate the collection of groundwater samples. In the embodiment illustrated in FIG. 1 there are five such monitoring wells 38A, 38B, 38C, 38D and 38E from which to collect groundwater samples for periodic chemical analysis, whereby to monitor the progress of decontamination of the groundwater and hence the surrounding soil.

The method and system of this invention depends upon vertical movement of air or other oxygen containing gas upward from the bottom end of the tubings 18 in the aeration columns 14 and diffusion of the oxygen rising through groundwater in the columns. Oxygen dissolved in groundwater diffuses outward from the columns into the surrounding soil and groundwater contaminated with gasoline. Gasoline per se is capable of absorbing large amounts of oxygen, and as dissolved oxygen concentrations near the columns increase, respiration and reproductive rates of petroleum degrading indigenous microorganisms in the site subsurface also increase in response.

Figure 3:
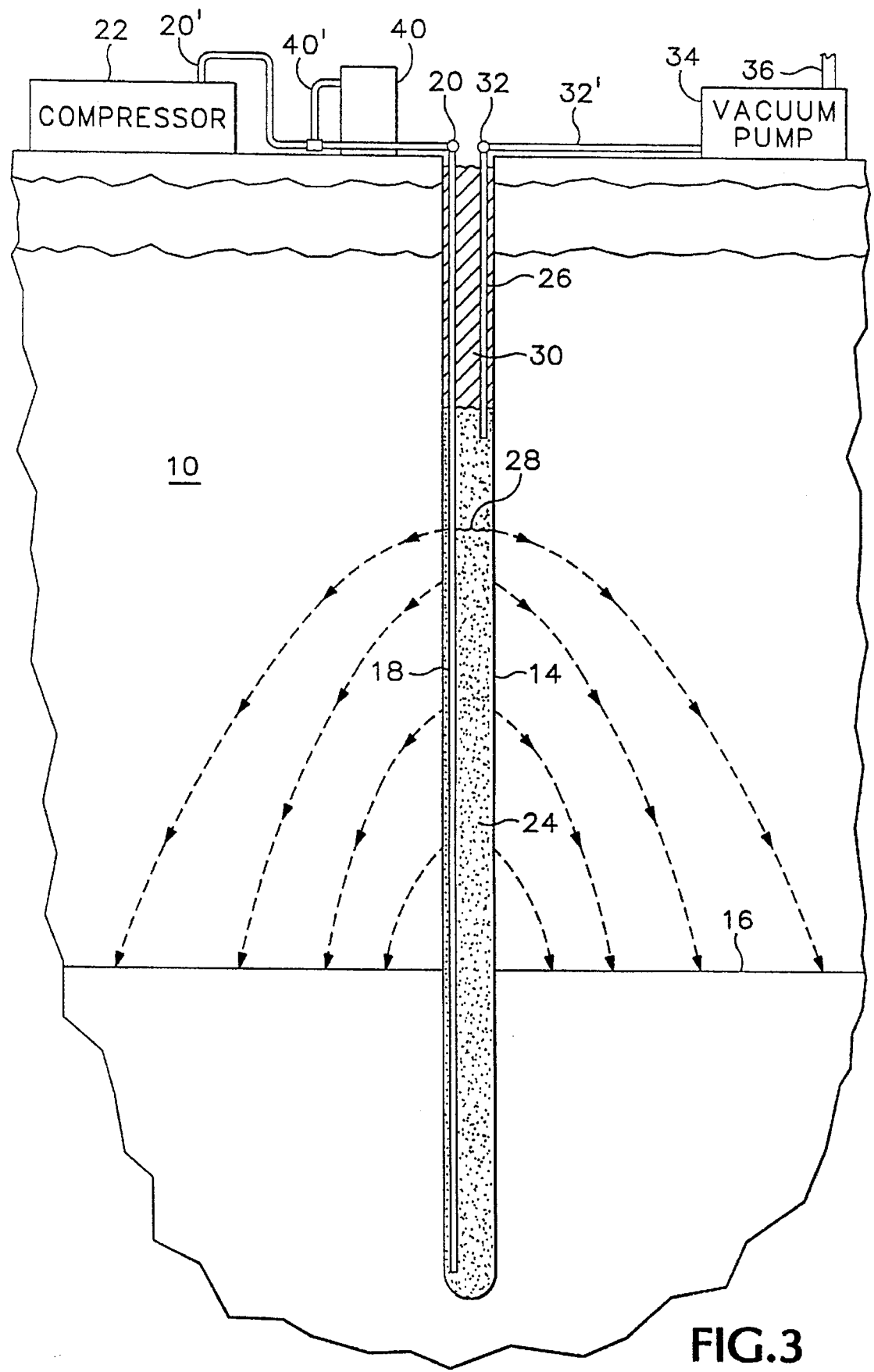
FIG. 3 is a fragmentary vertical section, on an enlarged scale, of one of the multiplicity of vertical air injection aeration columns shown in FIG. 1, the broken lines illustrating the diffusion of groundwater in the column outward and downward to the groundwater table, as in FIG. 2.

Circulation in the environment of an aeration column 14 is achieved by turbulence in the water in the column induced by the stream of air bubbles rising through it, and by wetting of the soil around the column above the groundwater surface 16 and slow seepage of this water through the soil and back down to the groundwater surface. This is illustrated by the broken lines in FIGS. 2 and 3. The soil wetting and seepage effect depends upon a height differential between the column water level 28 and the groundwater level 16. This differential is caused by a reduction in specific gravity of water in the column due to the inclusion of air bubbles. Hydrostatic pressure around the column forces the column water upward. As explained hereinbefore, the air pressure from compressor 22 must be sufficient to overcome the hydrostatic pressure of the water at the bottom end of the tubing 18.

Limited fertilization can occur in and around the aeration column as microorganisms in the oxygenated environment capture nitrogen, phophorous, potassium and micronutrients in the process of degrading naturally occurring organic sediments in native soil. This natural fertilization normally is insufficient, however, and must, as a practical matter, be reinforced artificially by the addition of biologically available nitrogen sources. It has been discovered that the addition of dissolved bacterial or yeast cultures, ammonia gas, urea, soluble nitrogen salts, etc., into the aeration column 14 functions to significantly accelerate the degradation of gasoline. For example, the reduction in concentrations of gasoline constituents in groundwater to drinking water standards by treatment with oxygen sparging alone, requires a treatment time of several years. In contrast, as shown in Table I, the addition of water-dissolved nitrogen reduces the treatment time to about one and one-half months to 15 months, depending upon the porosity of the soil.

The supply of dissolved nitrogen may be derived from a variety of sources. For example, bacterial or yeast cultures, ammonia, liquid fertilizers, urea, or other sources of dissolved nitrogen, may be delivered from a container 40 and tube 40' into the pipe 20' which delivers air to the tubings 18. Alternatively, a separate set of tubings and manifold, similar to the tubings 18 and manifold 20, may be provided for delivering water-dissolved nitrogen to the aeration columns 14.

The amount of water-dissolved nitrogen introduced into each aeration column may be varied over a wide range, depending upon the concentration of gasoline in the groundwater, the porosity of the soil and the time chosen for treatment. Accordingly, monitoring of the progress of decontamination by chemical analysis of groundwater samplings from the monitoring wells, provides the information required to determine the amount of dissolved nitrogen to be introduced from time to time into the aeration columns.

A typical installation and operation of the system of this invention is as follows: A multiplicity (78) of 1" (2.54 cm) diameter aeration columns 14 were placed throughout the area (about one-third acre) of gasoline release in a site 10.

The columns were about 9 ft. (2.74 m) in depth and were spaced about 5 ft (1.5 m) apart. Each column received a 10 ft. (3 m) length of ¼" (6.35 mm) diameter polyethylene tubing 18 encased in a thick wrapping of filter fabric. The tubings 18 were coupled through manifold 20 to air supply compressor 22 which delivered a high volume of atmospheric air at about 2 psi to the air delivery tubings 18. Liquid fertilizer was introduced from container 40 at a rate of about 10 gallons (3.8 ltrs.) per day.

Each of the five monitoring wells (FIG. 1) was formed of a 6" (1.27 cm) diameter boring to a depth of 10.5 ft. (3.2 m). Within the boring was a 5 ft. (1.5 m) long, 2" (5 cm) diameter slotted PVC screen and a 5 ft. long, 2" diameter riser. A stainless steel centralizer held the screen in position as a sand pack was installed around it. The sand pack surrounded the screen and riser within the boring and a 3 ft. (1 m) layer of bentonite chips was installed over the sand pack to provide a seal. A locking, 8" (20 cm) steel well cover was cemented into the asphalt pavement of the site 10.

The system was operated for a period of about two years, with samples of groundwater taken at 3 month intervals, beginning about four months prior to activation of the system on 7 Jul. 1993. Chemical analysis of the groundwater samples was made by EPA Method 8020 for quantification of benzene, toluene, ethylbenzene and xylenes (BTEX). Table I tabulates the chemical analyses of the samplings. In the Table, the term "dry" indicates that the groundwater level fell below the bottom of the monitoring well and hence a sample was not available for testing.

TABLE I

| well number | sampling date | benzene (ppb) | toluene (ppb) | ethylbenzene (ppb) | xylenes (ppb) |
|---|---|---|---|---|---|
| 38A | | | | | |
| | 03/16/93 | 400 | 10 | 1 | 31 |
| | 06/10/93 | 380 | 4 | <0.5 | 11 |
| | 07/28/93 | 5 | 3 | <0.5 | <1.5 |
| | 09/16/93 | dry | dry | dry | dry |
| | 12/13/94 | <5.0 | <10.0 | <5.0 | <15.0 |
| | 03/22/94 | <0.5 | <0.5 | <0.5 | <1.5 |
| | 06/08/94 | <0.5 | <0.5 | <0.5 | 4 |
| | 09/08/94 | 1 | 1 | <0.5 | <1.5 |
| | 12/02/94 | 1 | 1 | <0.5 | <1.5 |
| | 03/07/95 | <0.5 | 1 | <0.5 | <1.5 |
| 38B | | | | | |
| | 03/16/93 | 3400 | 1400 | 950 | 1800 |
| | 06/10/93 | 2900 | 110 | 440 | 2800 |
| | 07/28/93 | 1500 | 46 | 400 | 1300 |
| | 09/16/93 | dry | dry | dry | dry |
| | 12/13/93 | 76 | 200 | 290 | 410 |
| | 03/22/94 | 120 | 7 | 44 | 110 |
| | 04/18/94 | 71 | 7 | 10 | 65 |
| | 06/08/94 | 320 | 270 | 30 | 120 |
| | 09/08/94 | 43 | 1 | 5 | 31 |
| | 12/02/94 | 52 | 4 | <0.5 | <1.5 |
| | 03/07/95 | 160 | 5 | <0.5 | <1.5 |
| 38C | | | | | |
| | 03/16/93 | 3900 | 72 | 11 | 130 |
| | 06/10/93 | 4400 | 100 | 220 | 250 |
| | 07/28/93 | dry | dry | dry | dry |
| | 09/16/93 | dry | dry | dry | dry |
| | 12/13/93 | <50 | <100 | <50 | <150 |
| | 03/22/94 | 220 | 3 | 11 | 80 |
| | 04/18/94 | 37 | 1 | 3 | 17 |
| | 06/08/94 | 1 | 1 | 1 | <1.5 |
| | 09/08/94 | 4 | 2 | 1 | <1.5 |
| | 12/02/94 | <0.5 | <0.5 | <0.5 | <1.5 |
| | 03/07/95 | 4 | 4 | <0.5 | <1.5 |

TABLE I-continued

| well number | sampling date | benzene (ppb) | toluene (ppb) | ethylbenzene (ppb) | xylenes (ppb) |
|---|---|---|---|---|---|
| 38D | | | | | |
| | 03/16/93 | 1 | 6 | <0.5 | <1.5 |
| | 06/10/93 | 1 | <0.5 | <0.5 | <1.5 |
| | 07/28/93 | dry | dry | dry | dry |
| | 09/16/93 | dry | dry | dry | dry |
| | 12/13/93 | <0.5 | <0.5 | <0.5 | <1.5 |
| | 03/22/94 | <0.5 | <0.5 | <0.5 | <1.5 |
| | 06/08/94 | <0.5 | <0.5 | <0.5 | 4 |
| | 09/08/94 | 1 | 1 | <0.5 | 2 |
| | 12/02/94 | <0.5 | <0.5 | <0.5 | <1.5 |
| | 03/07/95 | <0.5 | <0.5 | <0.5 | <1.5 |
| 38E | | | | | |
| | 03/16/93 | 55 | 130 | 180 | 270 |
| | 06/10/93 | 16 | 33 | 34 | 190 |
| | 07/28/93 | 29 | 42 | 91 | 25 |
| | 09/16/93 | dry | dry | dry | dry |
| | 12/13/93 | 110 | 340 | 110 | <150 |
| | 03/22/94 | 1 | 20 | 7 | 2 |
| | 04/18/94 | 12 | 6 | 1 | 3 |
| | 06/08/94 | 5 | 13 | 12 | 19 |
| | 09/08/94 | 2 | 39 | 80 | 64 |
| | 12/02/94 | 3 | 4 | <0.5 | <1.5 |
| | 03/07/95 | 1 | 7 | <0.5 | <1.5 |

It is to be noted from Table I that the chemical analysis of samplings at monitoring well 38A shows groundwater has achieved drinking water standards (5 ppb benzene) after operation of the system from 7 Jul. to 28 Jul. 1993. The analysis of well samples at monitoring well 38B shows substantial initial contamination before the system of the present invention was put into operation; a significant improvement was achieved by 28 Jul. 1993 and a marked reduction in contaminants was achieved by 18 Apr. 1994. However, further treatment is required to achieve drinking water standards because of a continuing leak of gasoline from a tank T (FIG. 1) that cannot be removed. Analysis of the samplings at monitoring well 38C shows a reduction in contaminants to drinking water standards by 8 Jun. 1994. Monitoring well 38D shows no significant contamination of groundwater. Analysis of the samplings of monitoring well 38E shows a large reduction in xylenes concentration after 8 months of operation of the system and achievement of drinking water standards by 22 Mar. 1994.

It is to be noted further from Table I that all of the monitoring wells, except well 38B, show achievement of drinking water standards by June 1994. This cleanup was confirmed later by analysis of soil from a test pit P. Accordingly, it is evident that the system of this invention is effective in decontaminating soils and groundwater of gasoline in relatively short treatment time.

It will be apparent to those skilled in the art that various changes may be made in the size, shape, type, number and arrangement of parts of the system and in the method steps described hereinbefore, without departing from the spirit of this invention and the scope of the appended claims.

I claim:

1. A method of decontaminating soil and groundwater of gasoline, comprising:
   a) forming a multiplicity of closely spaced hollow aeration columns in the soil extending substantially vertically to a depth below groundwater level,
   b) injecting oxygen containing gas into said vertical aeration columns below groundwater level, to reduce the specific gravity of the groundwater in the column and cause the oxygenated groundwater to rise in the column and then seep laterally out of the column and gravitate downward through the soil back to the groundwater at said groundwater level,
   c) introducing into the aeration columns a quantity of biologically available nitrogen, and
   d) continuing said injection of oxygen containing gas and introduction of nitrogen into the aeration columns and continuing said circulation of oxygenated groundwater upward through the aeration columns and laterally outward and downward through the soil back to the groundwater, for a time sufficient to decontaminate the soil and groundwater of gasoline.

2. The method of claim 1 wherein the oxygen containing gas is injected at a pressure sufficient to overcome the hydrostatic pressure of water in the aeration columns.

3. The method of claim 2 wherein the oxygen containing gas is air injected at a pressure of about 2–5 psi.

4. The method of claim 1 wherein the aeration columns are spaced apart not more than about 5 ft. (about 1.5 m).

5. The method of claim 1 wherein the source of biologically available nitrogen comprises one or more materials selected from the class consisting of bacterial cultures, yeast cultures, ammonia, urea, nitrogen containing fertilizers, and soluble nitrogen salts.

6. The method of claim 1 wherein the aeration columns are substantially filled with a porous material.

7. The method of claim 6 wherein the porous material is sand.

8. The method of claim 1 wherein each aeration column is fitted with a perforated pipe.

9. The method of claim 7 wherein the perforated pipe is substantially filled with a porous material.

10. The method of claim 9 wherein the porous material is sand.

11. The method of claim 1 wherein the oxygen containing gas is air.

12. A system for decontaminating soil and groundwater of gasoline, the system comprising:
   a) a multiplicity of hollow aeration columns formed in the soil of an area to be decontaminated and extending substantially vertically to a depth below groundwater level,
   b) a gas delivery tube in each aeration column extending to a depth below groundwater level,
   c) a source of oxygen containing gas coupled to each delivery tube for injecting oxygen containing gas into each aeration column below groundwater level in sufficient volume to reduce the specific gravity of the groundwater in the column and cause the oxygenated groundwater to rise in the column and then seep laterally out of the column and gravitate downward through the soil back to the groundwater at said groundwater level,
   d) a source of biologically available nitrogen arranged for introduction into each aeration column, and
   e) monitoring means for collecting and chemically analyzing groundwater in the area to be decontaminated.

13. The system of claim 12 wherein the source of oxygen containing gas provides gas pressure sufficient to overcome the hydrostatic pressure of water in the aeration columns.

14. The system of claim 13 wherein the source of oxygen containing gas is air provided at air pressure of about 2–5 psi.

15. The system of claim 12 wherein the aeration columns are spaced apart not more than about 5 feet (about 1.5 m).

16. The system of claim 12 wherein the source of biologically available nitrogen comprises one or more materials selected from the class consisting of bacterial cultures, yeast cultures, ammonia, urea, nitrogen containing fertilizers, and soluble nitrogen salts.

17. The system of claim 12 wherein the aeration columns are substantially filled with a porous material.

18. The system of claim 17 wherein the porous material is sand.

19. The system of claim 12 wherein the source of oxygen containing gas is air.

20. The system of claim 12 wherein each aeration column is about 1" (2.5 cm) in diameter, each delivery tube is about ¼" (6.35 mm) in diameter, the source of oxygen containing gas is air at a pressure sufficient to overcome the hydrostatic pressure of water in the aeration columns, and the source of biologically available nitrogen comprises one or more materials selected from the class consisting of bacterial cultures, yeast cultures, ammonia, urea, nitrogen containing fertilizers, and soluble nitrogen salts.

* * * * *